United States Patent [19]

Upton et al.

[11] 3,768,840

[45] Oct. 30, 1973

[54] PIPE COUPLINGS
[75] Inventors: Keith Allan Upton, Westwood, Margate; Raymond William Elliot, Broadstairs, both of England
[73] Assignee: Emco Wheaton U.K. Limited, Margate, England
[22] Filed: Mar. 4, 1971
[21] Appl. No.: 121,032

[30]  Foreign Application Priority Data
    Mar. 6, 1970  Great Britain ................. 10,976/70

[52] U.S. Cl. .................... 285/16, 285/93, 285/122, 285/272
[51] Int. Cl. ............................................ F16l 55/00
[58] Field of Search .................... 285/122, 16, 39, 285/18, 93, 190, 272, 273

[56]  References Cited
 UNITED STATES PATENTS
998,884  7/1911  Elvin ............................. 285/273 X
1,796,159  3/1931  Pallady ............................. 285/272
1,482,225  1/1924  Evans ................................. 285/122
1,582,246  4/1926  Buchanan ........................... 285/122

Primary Examiner—Jordan Franklin
Assistant Examiner—Wayne L. Shedd
Attorney—Bacon & Thomas

[57]  ABSTRACT

A pipe coupling, particularly for interconnecting large-diameter load-bearing pipes, comprising a pair of rotatably interconnectible tubular coupling elements adapted to be sealed relative to one another by an internal sealing ring, one of the elements being formed with an opening for access to the coupling interior to enable the sealing ring to be replaced, and internal holding means for the said sealing ring which holding means is releasable without any relative movement of the interconnected coupling elements being necessary, so that the sealing ring may be replaced without disconnecting the coupling to any extent.

14 Claims, 8 Drawing Figures

Patented Oct. 30, 1973  3,768,840
4 Sheets-Sheet 1
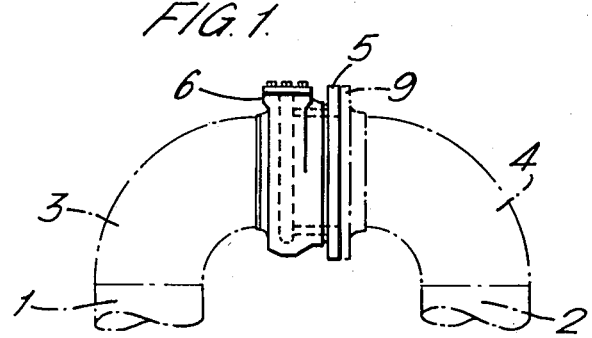
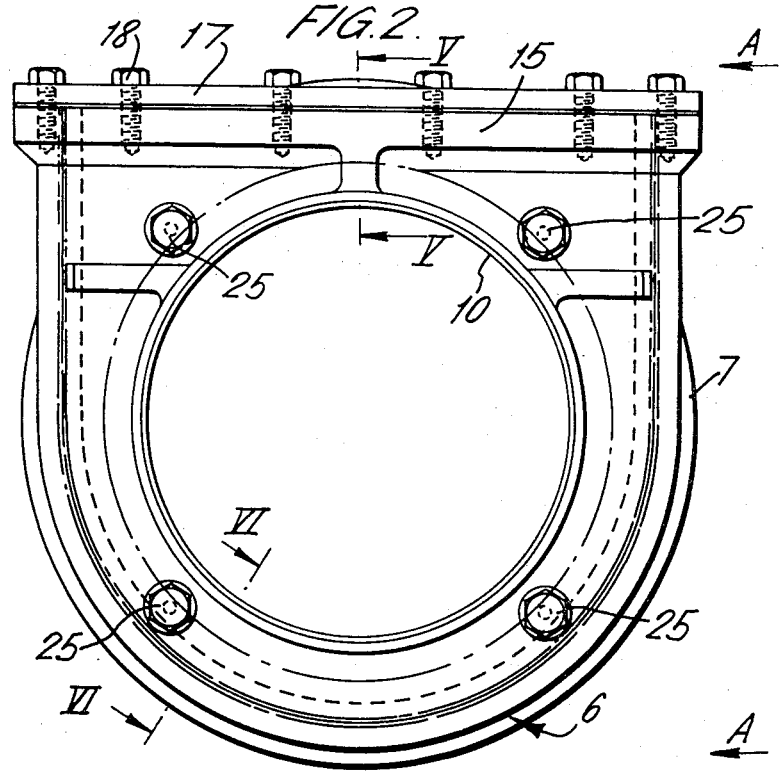
INVENTORS
KEITH A. UPTON
RAYMOND W. ELLIOTT
BY Bacon & Thomas
ATTORNEYS

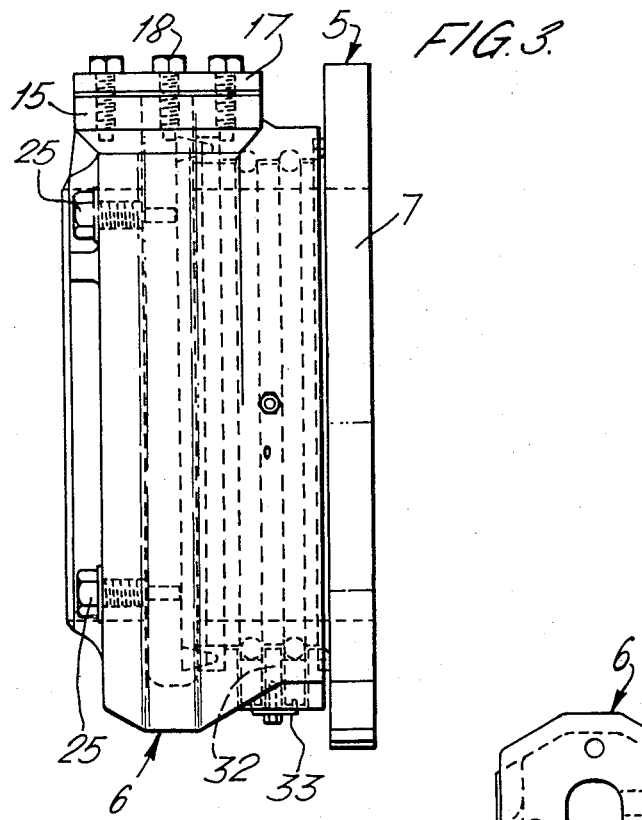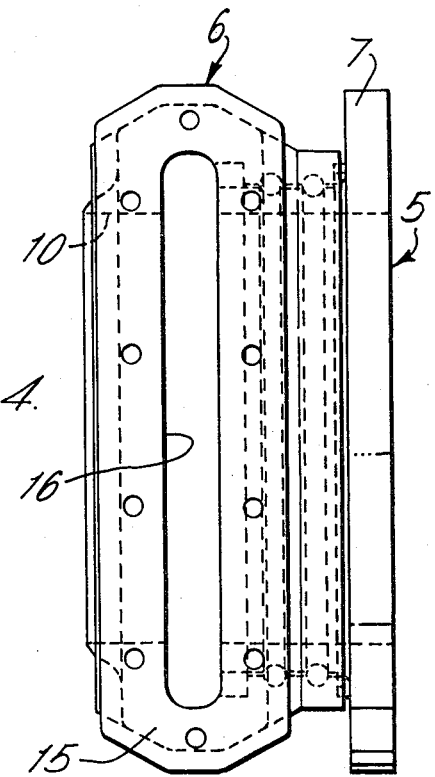

INVENTORS
KEITH A. UPTON
RAYMOND W. ELLIOTT
BY
Bacon & Thomas
ATTORNEYS

INVENTORS
KEITH A. UPTON
RAYMOND W. ELLIOTT
BY
Bacon & Thomas
ATTORNEYS

PIPE COUPLINGS

This invention relates to pipe couplings of the kind arranged to permit, in use, relative rotary movement of two pipes coupled thereby, whilst maintaining a sealed flow path through the coupled pipes.

In pipe couplings of this kind a sealing element arranged between two interconnectible and relatively rotatable elements of the coupling, themselves adapted for connection to the respective pipes, has to be replaced at intervals. Up to now this has involved dismantling the coupling to a greater or lesser extent, in any event to the extent of partially disconnecting the two said coupling elements. The latter operation does not cause any great difficulty when dealing with coupled pipes which are of comparatively small diameter, i.e., up to about 6 inches, whether or not the coupling is load-bearing. However when the coupled pipes are of comparatively large diameter, i.e., more than about 6 inches, and then particularly when the coupling is load-bearing (due to mechanical stresses in the coupled pipes), even partial dismantling of the coupling in order to replace the sealing element becomes a major operation. Thus, depending upon the particular circumstances, such a procedure may involve the provision of special rigging for supporting the pipes and/or the use of heavy duty cranes, as well as having side effects on other operations only indirectly connected with the use of the coupling in question, all of which is expensive and time-consuming.

According to the present invention there is provided a pipe coupling comprising two tubular coupling elements adapted to be sealingly secured in fluid flow relationship to respective pipes and being interconnectible in relatively rotatable fashion, said coupling elements being so formed as, when interconnected, to receive a sealing ring to seal the connection therebetween internally of the coupling, one of the coupling elements being formed with an opening, sealable by removable closure means, to provide access to the interior of the assembled coupling for replacement of the sealing ring, and holding means engageable with the sealing ring within the assembled coupling to prevent displacement of the ring from its sealing position, said holding means being movable relative to the interconnected coupling elements, without the need to move the coupling elements relative to one another, to a position permitting replacement of the sealing ring.

Thus the pipe coupling of the invention is so arranged that the internal sealing ring between the coupling elements may be removed and replaced without necessitating any relative movement, e.g., uncoupling movement, between the coupling elements or, as a result, between the two pipes to which they will be respectively secured in use. The said holding means for the sealing ring may obviously be of such a nature that the manner of its release and reengagement will not be dependent on the size of the interconnected pipes or on to what extent the coupling is load-bearing, so that the process of replacing the sealing ring of a coupling according to the invention is no more difficult in the case of a coupling between large, load-bearing pipes than when the pipes are of small diameter and do not bear any load. Thus the use of a coupling according to the invention to interconnect pipes of comparatively large diameter, and in particular in circumstances where the coupling will be subjected to continuous load, greatly facilitates the process of replacing the coupling seal when necessary.

In a preferred form of the invention the coupling is dimensioned for use in interconnecting pipes of at least six inches in diameter.

The concept of forming one of the coupling elements with an opening, sealable by removable closure means, to provide access to the interior of the assembled coupling for replacement of the sealing ring, is one which has been employed in the past to permit replacement of the sealing ring without complete dismantling of the coupling. In such known couplings, however, relative movement of the two coupling elements had to be effected in order to release the sealing ring for removal. As is already known from these earlier types of coupling, the said opening in one of the coupling elements may conveniently comprise an elongate slot formed in its tubular wall and extending at right angles to the coupling element axis, the length of the slot being somewhat greater than the diameter of the sealing ring so as to permit its removal and, in some embodiments of the invention also to permit the removal of one or more elements of the said holding means for the sealing ring. The removable closure means for the opening may conveniently comprise a cover plate securable over the opening, e.g., by bolts, to seal it.

The holding means for preventing displacement of the sealing ring from its sealing position inside the assembled coupling may take any of a variety of forms. Thus in some forms of the invention such holding means is housed entirely within the coupling when assembled and is removable or displaceable via the said opening in one of the coupling elements, when the sealing ring is to be replaced. In other embodiments of the invention operating means for engaging the holding means with the sealing ring and for releasing it therefrom may be mounted in the wall of one of the coupling elements to extend therethrough and be operable from outside of the assembled coupling.

One embodiment of the invention, in which the holding means simply comprises at least one holding ring mountable in the assembled coupling and engagable with the sealing ring to prevent displacement of the latter from its sealing position, is suitable for use when the sealing ring is formed of a sufficiently resilient material (such as synthetic rubber) as sealingly to engage with appropriately formed surfaces of the respective coupling elements by virtue of its resilience. In theses circumstances the holding means is not required to apply any pressure to the sealing ring and in fact it need not engage it at all in normal operation, the holding means simply occupying a position to prevent displacement of the sealing ring from its sealing position if it should work loose, for example. In such an embodiment the said holding ring may itself be held in position in some suitable manner, e.g., by means of a spacer ring engaging between it and a radially extending wall of one of the coupling elements at one of the axial ends of the space within the coupling.

Another form of the invention, in which the holding means again includes a holding ring engageable with the sealing ring but further includes means for pressing the holding ring against the sealing ring during operation, is particularly suitable for use when the sealing ring is formed of a material which is of low resilience but is highly resistant to attack by acidic substances, such as p.t.f.e. for example; the use of such materials is essential in many circumstances in which the substance which is to flow through the coupled pipes is of an acidic nature (such as dilute sulphuric acid) which would quickly break down a sealing ring formed of a highly resilient material such as synthetic rubber. In a preferred embodiment of this form of the invention one of the coupling elements has a number of pressing members screw-threadedly mounted to extend through its wall for the inner ends thereof to engage with the holding ring, preferably in spring-biased fashion, and being rotatable from outside of the coupling element to press the holding ring into engagement with the sealing ring to provide an effective seal between the coupling elements. If desired the said holding ring could be omitted from this form of the invention and the said pressing members arranged to engage directly with a sealing ring of substantially rigid construction provided with a surface layer of sealing material such as p.t.f.e.; in such an embodiment of the invention the said pressing members will of course constitute the aforementioned holding means for the sealing ring.

The sealing ring for use in couplings according to the invention may take any of a variety of forms. It will, however, preferably be of such a kind as to apply its sealing force in directions radially of the assembled coupling, i.e., at right angles to the coupling axis. In a preferred form of the invention in which the interengagement between the two coupling elements is via cylindrical faces thereof, one of the elements is formed with a right-angled step at the inner end of such face so as to define, in conjunction with the adjacent face of the other element, a rectangular slot for the reception of the sealing ring. The sealing ring is then preferably substantially U-shaped or V-shaped in cross-section and fits in the slot with its arms engaging the opposite cylindrical walls of the latter to provide the necessary seal. When the sealing ring is of material having little resilience a holding ring will then be engagable between the arms of the U-section to press them outwardly against the surfaces of the respective coupling elements; when, on the other hand, the sealing ring is of resilient material and is similarly U-shaped or V-shaped in cross-section it will be made somewhat wider than the slot so that its arms press outwardly against the sides of the slot to provide the seal.

A notable adavantage of forms of the invention in which the said holding means is such as to urge the sealing ring into its sealing position, e.g., by means of pressing members screw-threadedly mounted in one of the coupling elements, is that wear on the sealing ring may be taken up by tightening the holding means during use, thus prolonging the life of the sealing ring as compared with arrangements in which no such tightening action is possible.

When the coupling elements are formed to define a slot for the reception of the sealing ring it will usually be necessary to provide some facility for displacing the sealing ring out of such slot when it is to be replaced. In a preferred form of the invention two or more passages are formed in one of the coupling elements extending between the base of the said slot and the exterior of the coupling for the insertion of a tool, such as a push rod, for pushing the sealing ring out of the slot. A notable advantage of the provision of such passages is that leakage will occur through them if the sealing ring fails in use and such leakage will be substantial enough to be immediately apparent to an operator so that he can shut off the flow through the coupling almost as soon as the leakage begins.

The rotatable engagement between the two coupling elements will preferably be via one or more sets of ball or roller bearings which may also conveniently serve to hold the coupling elements together against axial movement.

In order that the invention may be readily understood two embodiments thereof will now be described by way of example and with reference to the accompanying drawings, in which:

FIG. 1 is a view in side elevation of two pipes connected for relative rotation by a coupling according to the invention;

FIG. 2 is an end elevation of the coupling looking from the left hand side of FIG. 1 and drawn to a much larger scale;

FIG. 3 is a side elevation of the coupling looking in the direction of the arrows A—A in FIG. 2;

FIG. 4 is a plan view of the coupling with the removable closure means removed;

Figure 5:
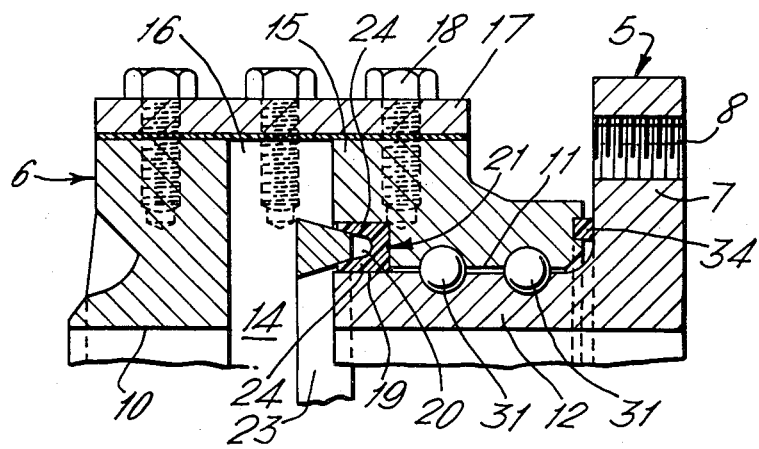
FIG. 5 is a cross-section on the line V—V of FIG. 2.

Referring to FIGS. 1 to 6, the coupling of this embodiment of the invention is one which is dimensioned to interconnect two pipes 1 and 2 of approximately 12 inches in diameter to permit relative rotation between the pipes whilst maintaining the sealed flow path therethrough. In the particular arrangement illustrated in FIG. 1 the coupling is used to interconnect two elbow pipe members 3 and 4 joined to respective pipes 1 and 2 extending parallel with one another.

The coupling comprises two tubular coupling elements 5 and 6 of which the element 5 is substantially L-shaped in cross section and has its flange 7 formed with a number of apertures 8 to receive bolts to enable it to be sealingly secured to a pipe flange 9 (FIG. 1). The element 6, on the other hand, is formed with an internal cylindrical surface 10 which will be butted against the end of a pipe and welded thereto, and a second substantially cylindrical surface 11 engageable over the cylindrical part 12 of the element 5, whilst the medial part 13 of the element 6 is substantially U-shaped in cross-section to define an internal annular space 14 for the reception of holding means to be associated with a sealing ring between the two coupling elements.

The coupling element 6 is formed with a block portion 15 having an elongate slot 16 therein extending at right angles to the coupling axis to provide access to the interior of the coupling and sealingly closable by means of a cover plate 17 adapted to be secured in position by bolts 18.

The coupling element 6 is formed with a right-angled step at the inner end of its cylindrical surface 11 to define, in conjunction with the adjacent cylindrical surface 19 of the coupling element 5, a rectangular slot 20 for the reception of a sealing ring 21. This coupling is particularly adapted for use when the substance which is to flow through the coupled pipes is of an acidic nature which would quickly break down a sealing ring formed of resilient material, and the sealing ring 21 of this embodiment is made of a material having little resilience, but high resistance to attack by acidic substances, such as p.t.f.e. for example. The sealing ring 21 is substantially U-shaped in cross-section and is a close fit in the slot 20. Two passages 22 are formed through the wall of the coupling element 6, 180° displaced from each other, for the insertion of a push rod to push the sealing ring 21 out of the slot 20 when it is to be replaced. The passages 22 also provide a path for leakage out of the coupling should the sealing ring fail, as mentioned before.

Figure 6:
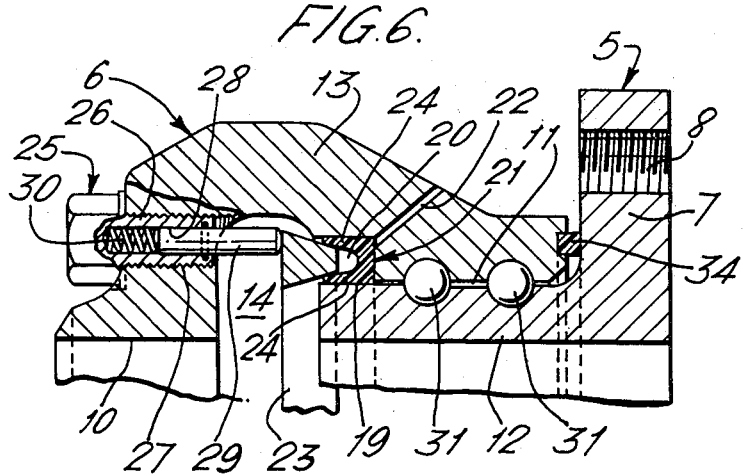
FIG. 6 is a cross-section on the line VI—VI of FIG. 2.

In this embodiment the holding means for preventing displacement of the sealing ring 21 from its illustrated sealing position includes a holding ring 23 which is wedge-shaped in cross-section and is dimensioned to be insertable between the arms 24 of the sealing ring 21 so as, when urged to the right as seen in FIGS. 5 and 6, to press the arms of the sealing ring radially inwardly and outwardly respectively against the adjacent faces of the respective coupling elements to provide an efficient seal therebetween. The holding means further comprise four adjustable seal pressing members, generally indicated at 25, spaced equally around the coupling element 6 and operable from outside of the latter to urge the holding ring 23 into tight engagement with the sealing ring 21. Referring particularly to FIG. 6, each such seal pressing member comprise a hexagonal headed screw-threaded bolt 26 mounted in a threaded bore 27 in the wall of the coupling element 6 and itself formed with a bore 28 receiving a pin 29 which is urged inwardly into engagement with the holding ring 23 by a compression spring 30 housed in the bore 28. It will thus be seen that when the bolts 26 are screwed into the coupling element 6 the pins 29 are moved to the right as seen in FIG. 6 so as to force the holding ring 23 into the sealing ring 21 and thus urge the arms 24 of the latter into sealing engagement with the coupling elements. In addition to providing the means for urging the arms of the sealing ring into sealing engagement with the respective coupling elements, the pressing members enables the sealing ring to be tightened up if it should wear during use, by screwing in the bolts 26. An acid resistant sealing washer, of p.t.f.e. for example, surrounds each pin 29 in the bore of bolt 26 to protect the spring 30 against acid attack.

Relative rotation of the two coupling elements 5 and 6 is provided for by two sets of ball bearings 31 running in semi-circular grooves in the respective coupling elements, which bearings also hold the coupling elements together against axial displacement relative to one another. The ball bearings are inserted through a passage 32 (FIG. 3) formed in the wall of the coupling element 6 and closed by a plug 33. An acid resistant packing 34 is provided between the two coupling elements outwardly of the ball bearings to keep grease in and dirt out.

When the sealing ring 21 of the coupling needs to be replaced the cover plate 17 is removed and the seal pressing members 25 slackened off sufficiently to enable the holding ring 23 to be moved to the left as seen in FIGS. 5 and 6 and lifted out of the coupling through the slot 16. The sealing ring 21 will then be pushed out of its slot 20 by a push rod inserted through the passages 22 and similarly lifted out of the coupling through the slot 16. A new sealing ring can then be inserted, followed by the holding ring 23, and the assembly brought back to its operative condition by tightening up on the pressing members 25. It has been found that this operation can be carried out in less than half an hour. It will be noted that no movement of the two coupling elements relative to one another is necessary in order to remove and replace the sealing ring so that the ease of carrying out this operation is in no way dependent on the size of the elements concerned or on the load which is being carried by the coupling.

Figure 7:
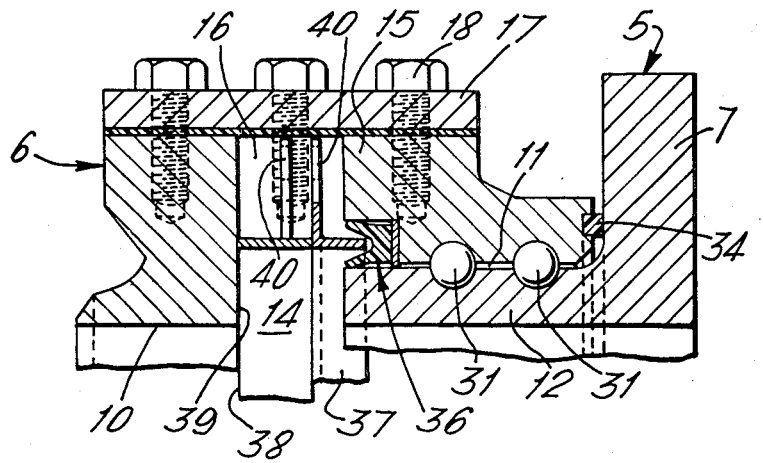
FIG. 7 is a cross-section, taken at a position similar to FIG. 5, of a second embodiment.
Figure 8:
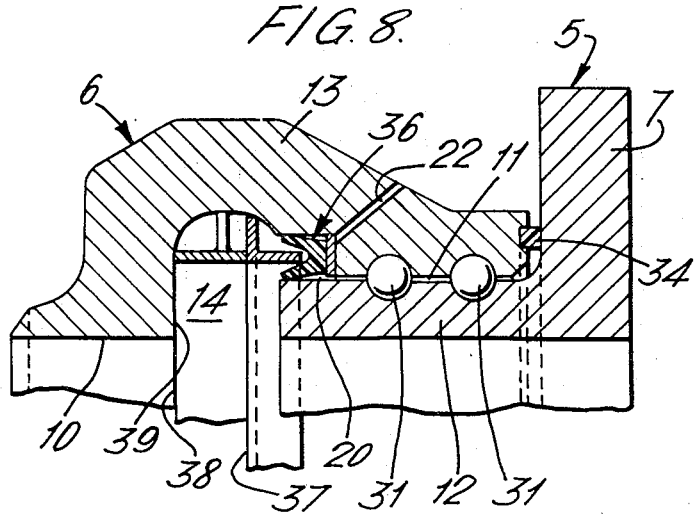
FIG. 8 is a cross-section of such second embodiment taken at a position similar to FIG. 6.

Referring now to the second embodiment of the invention, illustrated in FIGS. 7 and 8, this only differs from the first in the form of the sealing ring and the holding means therefor; parts which are similar to those of the embodiment of FIGS. 1 to 6 are given the same reference numerals and will not be described again. This embodiment is one which can be used when the substance which is to flow through the coupled pipes is not of a nature which will attack a sealing ring made of resilient material such as synthetic rubber. The synthetic rubber sealing ring 36 is in this embodiment substantially V-shaped in cross-section and is made of a width rather greater than the width of the slot 20 which receives it so that, when inserted in the slot, it will expand radially into sealing engagement with the opposite walls of the slot. As a result it is not necessary for the holding means to engage the sealing ring to force it into sealing engagement with the slot walls. Therefore, in this embodiment, the holding means simply comprises a holding ring 37 of L-shaped cross-section and a packing ring 38 which is positioned between the holding ring 37 and the internal face 39 of the coupling element 6 to maintain the position of the holding ring and prevent its movement to the left as seen in FIGS. 7 and 8. The holding ring and packing ring sit in the annular space 14 defined within the coupling element 6 and are provided with ears 40 which extend upwardly into the slot 16 and are formed with complementary openings for the reception of a locking pin to prevent relative rotation of the two rings.

Thus in this embodiment the holding ring 37 occupies a position in which it normally does not engage the sealing ring 36 but nevertheless is so placed as to prevent displacement of the sealing ring from its sealing position, i.e. to prevent any substantial movement thereof to the left as seen in FIGS. 7 and 8.

When the sealing ring 36 of this embodiment is to be changed the cover plate 17 will be removed as before and the packing ring 38 will be withdrawn, having first been disconnected from the holding ring 37. The holding ring can then be moved to the left as seen in FIGS. 7 and 8 a sufficient distance to permit the sealing ring 36 to be pushed out of its slot 20 and removed and replaced by a new one. The holding ring will then be reinserted in the space between the side arms of the sealing ring and the packing ring replaced and reconnected to the holding ring.

It will thus be seen that the invention provides couplings which are so arranged as to permit replacement of their internal seal, when needed, without any relative movement being necessary between the coupling elements and thus between two pipes which they interconnect. Thus the ease of carrying out this operation is in no way dependent upon the size of the coupling or the load borne thereby. Couplings according to the invention are particularly useful for interconnecting successive pipe sections of fluid transfer apparatus such as marine loaders for transferring oil, gas and other commodities between ship and shore, in which provision must be made for relative rotary movement between the successive pipe sections because of the variable position of the ship. Marine loaders, particularly for loading and unloading large tankers, are very massive structures and the replacement of their coupling seals has up to now involved serious problems in supporting the pipe sections concerned during such replacement, which problems may be very much reduced by the application of the present invention.

What we claim is:

1. A pipe coupling comprising two tubular coupling elements interconnected for relative rotation about a common axis of said elements and defining a straight flow path through said elements, substantially along said axis, for material flowing through the coupling, a sealing ring engaged with both of said coupling elements internally thereof to seal the connection therebetween, the axis of said sealing ring being coincident with the rotational axis of said coupling elements, holding means engageable with the sealing ring internally of the coupling elements to prevent displacement of the ring from its sealing position, one of the coupling elements having a side wall portion formed with an opening arranged to one side of said holding means and sealing ring, and removable closure means for sealing said opening, said holding means being accessible through said opening for movement to a position permitting replacement of said sealing ring via said opening without any relative movement of the said coupling elements being necessary.

2. A coupling as claimed in claim 1, which is dimensioned for use in interconnecting pipes of at least six inches in diameter.

3. A coupling as claimed in claim 1, wherein the said holding means includes a holding ring mountable in the assembled coupling and directly engageable with the said sealing ring.

4. A coupling as claimed in claim 3, wherein the said holding means is housed entirely within the coupling when assembled and is removable or displaceable via the said opening in one of the coupling elements, when the sealing ring is to be replaced.

5. A coupling as claimed in claim 4, wherein the said holding means further includes a spacer ring for holding the said holding ring in its operative position, said spacer ring being engageable between the holding ring and a radially extending wall of one of the coupling elements.

6. A coupling as claimed in claim 1, wherein the said sealing ring is formed of a material of high resilience and is shaped so as sealingly to engage with surfaces of the respective coupling elements by virtue of its resilience.

7. A coupling as claimed in claim 1, wherein the said holding means includes means for pressing the sealing ring into its sealing position in operation.

8. A coupling as claimed in claim 7, wherein the said pressing means comprises a plurality of pressing members mounted to extend through a wall of one of the said coupling elements and being adjustable from outside of the assembled coupling to press the sealing ring into its sealing position.

9. A coupling as claimed in claim 8, wherein each of said pressing members is screw-threadedly mounted in the said wall of its associated coupling element.

10. A coupling as claimed in claim 8, wherein each of said pressing members comprises a body element and a pressing element resiliently mounted on said body element.

11. A coupling as claimed in claim 10, wherein said body element comprises a threaded bolt formed with a blind axial bore and said pressing element comprises a pin slidably mounted in said bore and urged outwardly by a compression spring.

12. A coupling as claimed in claim 1, wherein the said sealing ring is formed of sealing material of low resilience.

13. A coupling as claimed in claim 1, wherein the said coupling elements together define an annular slot of rectangular shape in cross-section for the reception of the said sealing ring, the opposite side walls of which slot are defined by the respective coupling elements, and the sealing ring is generally U-shaped in cross-section and is arranged to fit in the said slot with its arms sealingly engaging the said side walls thereof in operation.

14. A coupling as claimed in claim 13, wherein at least two passages are formed in one of the coupling elements extending between the base of the said slot and the exterior of the coupling for the insertion of a tool, such as a push rod, for pushing the sealing ring out of the slot.

* * * * *